United States Patent
Lee et al.

(10) Patent No.: US 8,892,119 B2
(45) Date of Patent: Nov. 18, 2014

(54) AUTOMATIC POSITION INFORMATION TRANSMISSION SYSTEM AND METHOD USING WIRELESS DATA NETWORK

(75) Inventors: Se-Yong Lee, Seoul (KR); Ki-Won Nam, Seoul (KR); Hyun-Jong Song, Seoul (KR); Kyo-Sik Hong, Anseong-si (KR); Chun-Dong Kim, Seoul (KR); Yeon-Seok Cho, Seoul (KR)

(73) Assignees: Se-Yong Lee, Seoul; TW Mobile Co., Ltd., Seoul (KR)

( * ) Notice: Subject to any disclaimer, the term of this patent is extended or adjusted under 35 U.S.C. 154(b) by 374 days.

(21) Appl. No.: 13/285,480

(22) Filed: Oct. 31, 2011

(65) Prior Publication Data

US 2013/0040665 A1 Feb. 14, 2013

(30) Foreign Application Priority Data

Aug. 12, 2011 (KR) ............................. 10-2011-80636

(51) Int. Cl.
*H04W 24/00* (2009.01)
*H04L 29/08* (2006.01)
*H04W 4/02* (2009.01)
*H04M 1/725* (2006.01)
*H04L 29/06* (2006.01)

(52) U.S. Cl.
CPC ........... *H04L 67/00* (2013.01); *H04M 1/72561* (2013.01); *H04W 4/028* (2013.01); *H04M 1/72572* (2013.01); *H04L 63/0869* (2013.01)
USPC ...................................... 455/456.1; 455/457

(58) Field of Classification Search
CPC ... H04L 67/00; H04L 63/0869; H04W 4/028; H04M 1/72561; H04M 1/72572
USPC ................................................ 455/457, 456.1
See application file for complete search history.

(56) References Cited

U.S. PATENT DOCUMENTS 7,333,820 B2 * 2/2008 Sheha et al. ................... 455/457
2012/0172062 A1 * 7/2012 Altman et al. ................ 455/457

* cited by examiner

*Primary Examiner* — Amancio Gonzalez
(74) *Attorney, Agent, or Firm* — Novick, Kim & Lee, PLLC; Jae Youn Kim

(57) ABSTRACT

Disclosed are an automatic position information transmission system and a method using a wireless data network capable of improving convenience of search by registering icons associated with keywords on search screens of corresponding mobile phones and registering icons representing a search position range on the search screens while improving convenience of use by automatically transmitting position information regarding the corresponding mobile phones during a call attempt to a pre-authorized specific mobile phone through a wireless Internet network and automatically transmitting the position information regarding the corresponding mobile phones for each predetermined period or at the time of a call connection failure. The automatic position information transmission system and the method using the wireless data network can automatically transmit the moving routes or positions of children to the mobile phones of a parent as being previously set without performing the separate operations on the mobile phones.

10 Claims, 10 Drawing Sheets

AUTOMATIC POSITION INFORMATION TRANSMISSION SYSTEM AND METHOD USING WIRELESS DATA NETWORK

RELATED APPLICATIONS

This application claims priority from Korean Patent Application No. 10-2011-80636, filed on Aug. 12, 2011 in the Korean Intellectual Property Office, the entire disclosure of which is incorporated herein by reference.

BACKGROUND OF THE INVENTION

1. Field of the Invention

The present invention relates to an automatic position information transmission system and a method using a wireless data network, and more particularly, to an automatic position information transmission system and a method using a wireless data network capable of improving convenience of search by registering icons associated with keywords on search screens of corresponding mobile phones and registering icons representing a search position range on the search screens while improving convenience of use by automatically transmitting position information regarding the corresponding mobile phones during a call attempt to a pre-authorized specific mobile phone through a wireless Internet network and automatically transmitting the position information regarding the corresponding mobile phones for each predetermined period or at the time of a call connection failure.

2. Description of the Related Art

As known, with the recent development of information and communication technologies, a development of information providing technologies capable of providing information regarding various fields to a plurality of subscribers in real time via at least one host server using a long-distance data communication network has been actively conducted.

Based on the development of peripheral technologies such as cache memory extension technology, or the like, for more rapidly providing accurate information to subscribers and information sorting technology and information compression technology for more conveniently approaching a subscriber's taste and preference have been recently under development. Further, with the development of such technologies, development of various contents and solutions thereof has also been actively conducted.

Owing to the rapid technology development, mobile phones equipped with wireless data technologies capable of more rapidly transmitting larger-capacity data to mobile phones located at a remote place have been recently released.

Generally, when a receiver receives unwanted calls, he/she can reject the calls. However, when a telephone number of a caller is not previously registered in a mobile phone of a receiver, the receiver cannot confirm the corresponding caller and therefore, has no choice but to confirm the caller through a telephone call.

In addition, new mobile phones are equipped with a GPS module, which may recognize its own position coordinates. Therefore, the new mobile phones may transmit the corresponding position information according to a demand of an authorized third party (for example, parent), such that the third party can know where an owner of the corresponding mobile phone is positioned.

However, in order to use the function, the third party needs to request the position information regarding the corresponding mobile phones whenever he/she intends to receive the position of the specific mobile phone for each predetermined period. Therefore, there are problems in that the operation is complicated, more key operations are needed, and whenever the position information is requested, the request needs to be stored.

In addition, even though the third party requests the position information regarding the specific mobile phones, new mobile phones cannot transmit position information when the corresponding mobile phones are not present in an area in which the wireless data can be transmitted.

Meanwhile, new mobile phones can perform wireless Internet and therefore, need to frequently perform a local search when intending to search specific positions or places. Therefore, since there is a need to input keywords and a search radius whenever the local search is performed, it is very inconvenient to use new mobile phones.

In addition, the inconvenience of users that cannot skillfully input keywords or users that cannot skillfully determine whether or not to input any word as the keywords may be further increased.

SUMMARY OF THE INVENTION

Accordingly, it is an object of the present invention to provide an automatic position information transmission system and a method using a wireless data network capable of improving convenience of search by registering icons associated with keywords on search screens of corresponding mobile phones and registering icons representing a search position range on the search screens while improving convenience of use by automatically transmitting position information regarding the corresponding mobile phones during a call attempt to a pre-authorized specific mobile phone through a wireless Internet network and automatically transmitting the position information regarding the corresponding mobile phones for each predetermined period or at the time of a call connection failure.

According to an embodiment of the present invention, there is provided an automatic position information transmission system using a wireless data network, including: a mobile phone of a first user that generates request signals for automatic position information transmission of a mobile phone of a second user and receives position information automatically transmitted from a corresponding mobile phone of a second user according to authorized signals and outputs the received position information on a screen; and a mobile phone of a second user that receives request signals for the automatic position information transmission from the mobile phone of the first user and outputs the request signals through the screen, has a GPS module mounted therein so as to automatically transmit position coordinates to the mobile phone of the first user at the time of satisfying predetermined conditions according to the transmission of the authorized signals, and is equipped with automatic transmission programs.

Preferably, the mobile phone of the second user includes a wireless Internet interface that accesses a wireless Internet network to transmit position coordinates.

Preferably, the position coordinate transmission conditions of the mobile phone of the second user is a case in which the second user sets a predetermined period and a time range, a case in which the call connection is not performed at the time of the request of the call connection from the authorized mobile phone of the first user, or a case in which the position coordinates are changed.

Preferably, the mobile phone of the second user access the wireless Internet network to automatically transmit the corresponding position coordinates when the mobile phone of the second user receives the call connection request signals from the authorized mobile phone of the first user.

Preferably, the mobile phone of the second user automatically accesses the wireless Internet network to transmit the corresponding position coordinates when the mobile phone of the second user receives the call connection request signals from the authorized mobile phone of the first user, if the call connection is not performed for a predetermined time.

Preferably, an automatic position information transmission server that receives the position coordinates transmitted from the mobile phone of the first user and converts the received position coordinates into place information and transmits and processes the place information to the pre-authorized mobile phone of the second user.

Preferably, the authorization request signals of the mobile phone of the first user are time range and time period information for which it is desired to receive the telephone number information position information of the mobile phone of the first user.

Preferably, the mobile phone of the second user includes: a key input unit that selects the authorized signal and the position information transmission method; a display unit that outputs the key operation status or the information transmitted from the mobile phone of the first user on the screen; a duplexer that separates the transmitted/received signals by performing wireless communication with the base station of the mobile communication network through an antenna and includes a wireless Internet interface separately mounted therein; a wireless Internet interface that is mounted in the duplexer and accesses a wireless Internet server (WAP server) of a predetermined URL through the wireless Internet network in software as a demon for wireless Internet connection; a receiver that receives a voice signal or character or image information from the mobile phone of the second user or a wired telephone terminal or a mobile communication exchanger through the antenna and the duplexer; a transmitter that filters and amplifies the voice signal input from a microphone so as to be able to be transmitted; a voice processor that processes the voice signal from the other party received through the receiver, outputs the processed voice signal through a speaker and processes the voice signal of the user received from the microphone, and outputs the processed voice signal to the transmitter; a GPS receiving module that receives the position coordinates from a GPS satellite; a data combination unit that combines the position coordinates and the telephone number of the mobile phone of the first user that is the transmission object with the pre-registered character message; and a controller that determines whether the transmission conditions are satisfied according to the position information transmission request transmitted from the mobile phone of the first user, automatically combines the position coordinates if it is determined that the transmission conditions are satisfied, and accesses the wireless Internet network to transmit and process the position coordinates to the mobile phone of the first user.

Preferably, when the position coordinate transmission conditions are satisfied, the mobile phone of the second user searches whether the mobile phone of the second user periodically accesses the wireless Internet network when the mobile phone of the second user does not access the wireless Internet network and transmits and processes new position coordinates when the mobile phone of the second user accesses the wireless Internet network.

Preferably, the automatic position information transmission server includes: a communication module that communicates with the mobile phones of the first and second users; an automatic position sharing authorization unit that performs an authorization for sharing the mutual position information of the mobile phones of the first and second users according to whether the mutual request and authorization signal is received; a position information converter that converts the received position coordinates into the place information; an automatic transmission processor that automatically transmits and processes the position information to the matched other party mobile phone; a data storage unit that stores the place information and the authorized information regarding the position information sharing matched with each position coordinate; and a controller that controls each component to transmit and process the position information regarding the mobile phones of the first and second user.

According to another embodiment of the present invention, there is provided an automatic position information transmission method using a wireless data network, including: receiving, by a mobile phone of a second user, signals for position information transmission request authorization and condition information from a mobile phone of a first user; generating authorization signals by the mobile phone of the second user; registering condition information of position information transmission to the mobile phone of the second user; determining whether the mobile phone of the second user satisfies position information transmission conditions; extracting, the mobile phone of the second user, position information through a GPS module; transmitting the corresponding position information pre-stored in the mobile phone of the second user to the mobile phone of the first user.

Preferably, the condition information of the receiving is any one of a predetermined period and time range and an elapse of a predetermined time every time a call is connected or from a time when a call connection is not performed.

Preferably, the transmitting further includes searching whether the mobile phone of the second user periodically access a wireless Internet network when the mobile phone of the second user does not access the wireless Internet network and transmitting and processing new position coordinates at the time when being connected to the wireless Internet network.

As set forth above, the automatic position information transmission system and a method using the wireless data network according to the embodiments of the present invention can automatically transmit the moving routes or positions of children to the mobile phones of a parent as being previously set without performing the separate operations on the mobile phones, thereby improving the safety of children and security of the mobile. Further, the embodiments of the present invention can select and register the search icons from and on the screen even at the time of performing the search through the corresponding mobile phones, thereby improving the convenience of search.

Preferably, the mobile phone of the first user selects by clicking a plurality of search icons registered on the search screen to replace the keyword input and the search icons are matched with the keywords or are linked with codes matching the keywords so as to be transmitted.

Preferably, the automatic position information transmission server determines whether there are the search icons matching the corresponding keywords when the keywords are transmitted from the mobile phone of the first user as the character data and transmits the corresponding search icons to the mobile phone of the first user if it is determined that there are the search icons.

Preferably, the automatic position information transmission server further provides icons that register a search position range on a search screen by the mobile phone of the first user.

Preferably, the automatic position information transmission server automatically stores information on the non-existence of the corresponding search icons when there are no search icons matching keywords transmitted by the first user terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings.

Figure 1:
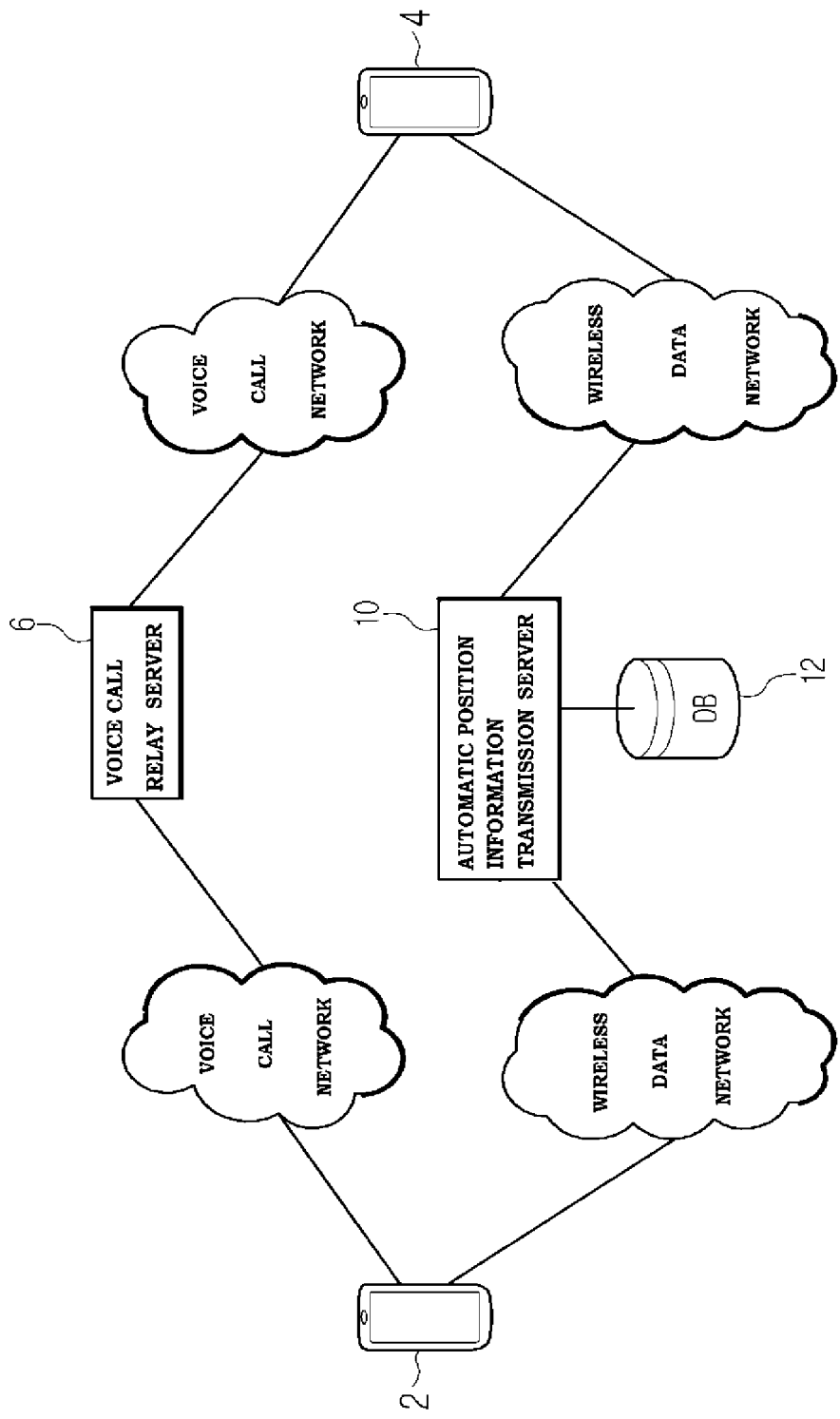
FIG. 1 is a diagram schematically showing a configuration of an automatic position information transmission system using a wireless data network according to an embodiment of the present invention.

FIG. 1 is a diagram schematically showing a configuration of an automatic position information transmission system using a wireless data network according to an embodiment of the present invention.

Referring to FIG. 1, the automatic position information transmission system using the wireless data network according to the embodiment of the present invention is a system for improving convenience of use by automatically transmitting position information regarding corresponding mobile phones during a call attempt to a pre-authorized specific mobile phone through a wireless internet network and automatically transmitting the position information regarding the corresponding mobile phones for each predetermined period or at the time of a call connection failure.

In more detail, the automatic position information transmission system using the wireless data network according to the embodiment of the present invention includes: a mobile phone 2 of a first user that generates request signals for automatic position information transmission of a mobile phone 4 of a second user and receives the position information automatically transmitted from the corresponding mobile phone 4 of the second user according to authorized signals and outputs the position information through a screen; and a mobile phone 4 of the second user that receives request signals for the automatic position information transmission from the mobile phone 2 of the first user and outputs the request signals through the screen, has a GPS module mounted therein so as to automatically transmit position coordinates to the mobile phone 2 of the first user at the time of satisfying predetermined conditions according to the transmission of the authorized signals, and is equipped with automatic transmission programs.

In this case, sharing information is provided to the automatic position information transmission system using the wireless data network according to the embodiment of the present invention. The sharing information is previously stored in each terminal, that is, the mobile phone 2 of the first user and the mobile phone 4 of the second user and thus, may be transmitted to mobile phones of called parties, respectively, during attempting call connection.

The sharing information may be configured of an owner's personal information of the corresponding mobile phones and thus, the receiver may receive the sharing information of the called parties and output the sharing information through the screen. Therefore, even though the caller information is not stored in the receiver's mobile phone, the receiver can know who the caller is.

That is, the automatic position information transmission system according to the embodiment of the present invention extracts the sharing information (caller's sharing information and receiver's sharing information) of each caller and receiver during attempting the call connection from any one mobile phone to another mobile phone and transmits the extracted sharing information to the mobile phones of the called parties, respectively, such that the receiver can rapidly confirm who the corresponding caller is even when the corresponding caller's telephone number is not registered in the mobile phone of the receiver. Further, the automatic position information transmission system according to the embodiment of the present invention may perform indirect advertisements and various information transfer functions through the sharing information of each caller and receiver.

The function of transmitting the position information of the embodiment of the present invention is also performed using a sharing information transmission method.

For example, the position information of the mobile phone 4 of the second user transmitted to the mobile phone 2 of the first user may be set in the mobile phone 4 of the second user so as to be transmitted for each predetermined period (for example, 1 hour) and may be also set in the mobile phone 4 of the second user so as to be transmitted whenever the mobile phone 4 of the second user is out of a predetermined range.

In addition, the mobile phone 4 of the second user (referred to as the mobile phone of the second user for convenience) includes a wireless Internet interface 22 (see FIG. 3) which accesses a wireless Internet network to transmit position coordinates.

That is, the method of transmitting the position information from the mobile phone 4 of the second user to the mobile phone 2 of the first user is a method of transmitting the position information through the wireless Internet network when the mobile phone 4 of the second user is present in the wireless Internet area (for example, WiFi possible area).

When the mobile phone 4 of the second user is not present in the wireless Internet area at the time of transmitting the position information, the mobile phone 4 of the second user searches the wireless Internet area and does not have a search function of transmitting the position information of the corresponding place until the wireless Internet area is searched.

In more detail, the position coordinate transmission conditions of the mobile phone 4 of the second user may be a case in which the second user sets a predetermined period and a time range, a case in which the call connection is not performed at the time of the request of the call connection from the authorized mobile phone 2 of the first user, or a case in which the position coordinates are changed.

In addition, when the mobile phone 4 of the second user receives the request signals of the call connection from the authorized mobile phone 2 of the first user, the mobile phone 4 of the second user may be configured to access the wireless Internet network so as to automatically transmit the corresponding position coordinates.

In addition, when the mobile phone 4 of the second user receives the request signals of the call connection from the authorized mobile phone 2 of the first user, the mobile phone 4 of the second user may be configured to access the wireless Internet network so as to automatically transmit the corresponding position coordinates when the call connection is not performed for a predetermined time.

That is, the mobile phone 4 of the second user included in the automatic position information transmission system using the wireless Internet network according to the embodiment of the present invention may transmit the position information to the mobile phone 2 of the first user for each predetermined period regardless of whether the call connection is performed and may automatically transmit the position information to the mobile phone 2 of the first user when the mobile phone 4 of the second user is out of a predetermined radius and may transmit the position information to the mobile phone 2 of the first user only when the mobile phone 4 of the second user receives the request signals of the call connection from the mobile phone 2 of the first user.

Therefore, the automatic position information transmission system using the wireless data network according to the embodiment of the present invention may further include a voice call relay server 6 that performs the call connection processing. The voice call relay server 6 is a known configuration and the detailed description thereof will be omitted.

Meanwhile, the automatic position information transmission system using the wireless data network according to the embodiment of the present invention is configured to directly transmit the position information to the mobile phone 2 of the first user when the mobile phone 4 of the second user satisfies the predetermined conditions. However, it is possible to transmit the position information via a separate server.

For example, the automatic position information transmission system using the wireless data network according to the embodiment of the present invention may further include an automatic position information transmission server 10 that receives the position coordinates transmitted from the mobile phone 2 of the first user and converts the received position coordinates into the place information and transmits and processes the location information to the pre-authorized mobile phone 4 of the second user.

In this case, the authorization request signal of the mobile phone 2 of the first user is information on a time range and a time period for which it is desired to receive the telephone number information and the position information of the mobile phone 2 of the first user.

Figure 2:
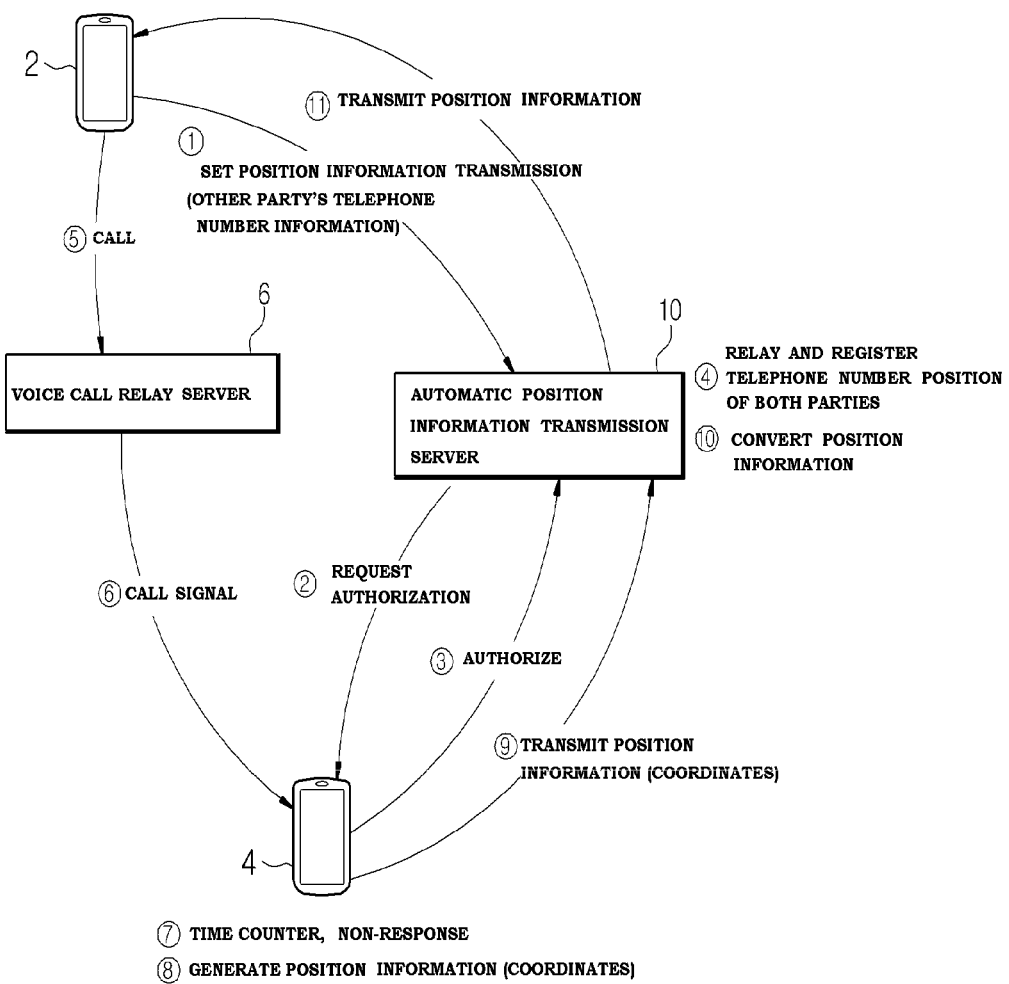
FIG. 2 is a diagram showing a data transmission status of the automatic position information transmission system using the wireless data network according to the embodiment of the present invention.

FIG. 2 is a diagram showing a data transmission status of the automatic position information transmission system using the wireless data network according to the embodiment of the present invention.

Referring to FIG. 2, the mobile phone 2 of the first user included in the automatic position information transmission system using the wireless data network according to the embodiment of the present invention transmits the request information including its own telephone number information and position information transmission condition information, and the third party's mobile phone number information to the automatic position information transmission server 10 so as to receive the position information of the children or a specific person.

In this case, the automatic position information transmission server 10 registers the corresponding information and transmits the corresponding authorization request information to the mobile phone 4 of the second user that is the other party.

When the authorized information is transmitted from the mobile phone 4 of the second user to the automatic position information transmission server 10, the automatic position information transmission server 10 registers the authorized information together with the telephone number information of both parties repeating the position information.

When the conditions to transmit the position information are satisfied in the state in which the automatic position information transmission server 10 performs the setting of the automatic position information transmission, the mobile phone 4 of the second user transmits the condition satisfaction signal to the automatic position information transmission server 10.

Thereafter, the automatic position information transmission server 10 extracts the telephone number of the mobile phone 2 of the first user that receives the previously linked position information and transmits the position information of the mobile phone 4 of the second user to the corresponding mobile phone 2 of the first user.

In the case in which non-response is continued for a predetermined time or more at the time of the call connection, when the call connection is not performed for a predetermined time even though the mobile phone 2 of the first user attempts the call connection to the mobile phone 4 of the second user in the state in which the conditions are set as transmitting the position information, the mobile phone 4 of the second user automatically extracts the position coordinates and transmits the extracted position coordinates to the automatic transmission server 10.

At this time, the automatic position information transmission server 10 converts the corresponding position coordinates into the place information and transmits the converted place information to the mobile phone 2 of the first user so as to be output on the screen.

In this case, the signal flow for transmitting the position information between the mobile phone 2 of the first user and the mobile phone 4 of the second user may be directly performed between the mobile phone 2 of the first user and the mobile phone 4 of the second user without passing through the automatic position information transmission server 10.

In particular, when the mobile phone 2 of the first user and the mobile phone 4 of the second user are recently released smart phones, it is possible to more easily perform the position information transmission illustrated in the embodiment of the present invention.

Figure 3:
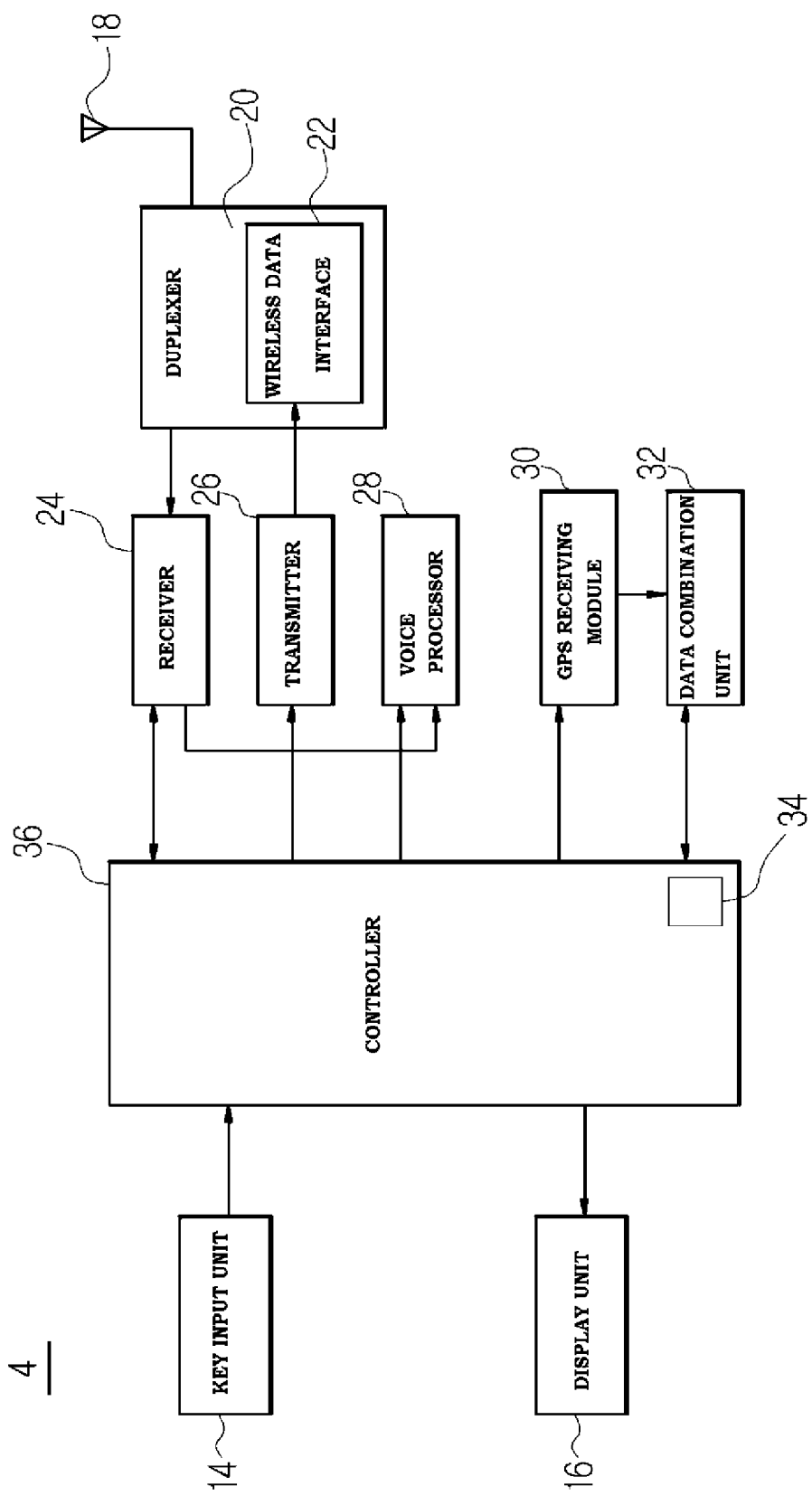
FIG. 3 is a block diagram showing a configuration of a mobile phone included in the automatic position information transmission system using the wireless data network according to the embodiment of the present invention.

FIG. 3 is a block diagram showing a configuration of a mobile phone included in the automatic position information transmission system using the wireless data network according to the embodiment of the present invention.

Referring to FIG. 3, the mobile phone included in the automatic position information transmission system using the wireless data network according to the embodiment of the present invention, for example, the mobile phone of the second user includes: a key input unit 4 that selects the authorized signal and the position information transmission method; a display unit 16 that outputs the key operation status or the information transmitted from the mobile phone 2 of the first user on the screen; a duplexer 20 that separates the transmitted/received signals by performing wireless communication with the base station of the mobile communication network through an antenna 18 and includes a wireless Internet interface 22 separately mounted therein; and a wireless Internet interface 22 that is mounted in the duplexer 20 and accesses a wireless Internet server (WAP server) of a predetermined URL through the wireless Internet network in software as a demon for wireless Internet connection.

In addition, the mobile phone 4 of the second user includes: a receiver 24 that receives a voice signal or character or image information from the mobile phone 4 of the second user or a wired telephone terminal or a mobile communication exchanger through the antenna 18 and the duplexer 20; a transmitter 26 that filters and amplifies the voice signal input from a microphone so as to be able to be transmitted; and a voice processor 28 that processes the voice signal from the other party received through the receiver 24, outputs the processed voice signal through a speaker and processes the voice signal of the user received from the microphone, and outputs the processed voice signal to the transmitter 26.

Meanwhile, the mobile phone 4 of the second user includes: a GPS receiving module 30 that receives the position coordinates from a GPS satellite; a data combination unit 32 that combines the position coordinates and the telephone number of the mobile phone 2 of the first user that is the transmission object with the pre-registered character message; and a controller 36 that determines whether the transmission conditions are satisfied according to the position information transmission request transmitted from the mobile phone 2 of the first user, automatically combines the position coordinates if it is determined that the transmission conditions are satisfied, and accesses the wireless Internet network to transmit and process the position coordinates to the mobile phone 2 of the first user.

When a period transmitting the position information is set, an electronic clock 34 for counting time is included in the controller 36.

Figure 4:
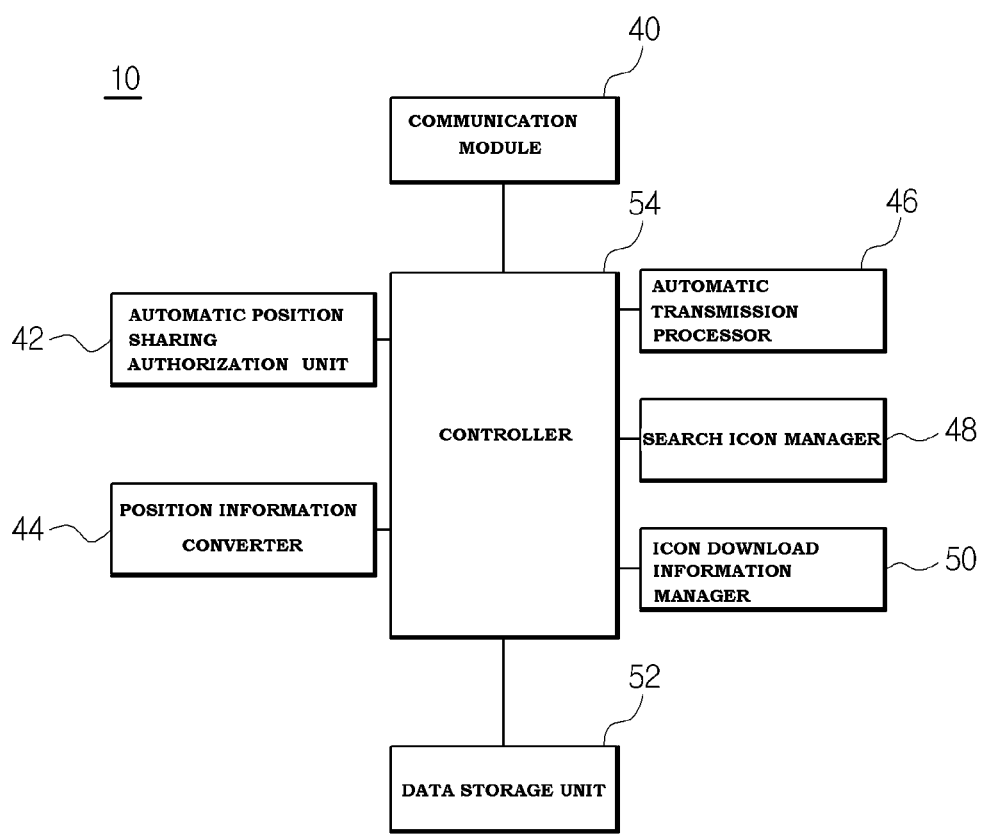
FIG. 4 is a block diagram showing a configuration of an automatic position information transmission server included in the automatic position information transmission system using the wireless data network according to the embodiment of the present invention.

FIG. 4 is a block diagram showing a configuration of an automatic position information transmission server included in the automatic position information transmission system using the wireless data network according to the embodiment of the present invention.

Referring to FIG. 4, the automatic position information transmission server 10 included in the automatic position information transmission system using the wireless data network according to the embodiment of the present invention includes: a communication module 40 that communicates with the mobile phones 2 and 4 of the first and second users; an automatic position sharing authorization unit 42 that performs the authorization for sharing the mutual position information of the mobile phones 2 and 4 of the first and second users according to whether the mutual request and authorization signal is received; and a position information converter 44 that converts the received position coordinates into the place information.

In addition, the automatic position information transmission server 10 includes: an automatic transmission processor 46 that automatically transmits and processes the position information to the matched other party mobile phone; a data storage unit 52 that stores the place information and the authorized information regarding the position information sharing matched with each position coordinate; and a controller 54 that controls each component to transmit and process the position information regarding the mobile phones 2 and 4 of the first and second user.

Non-explained reference numerals 48 and 50 will be described in detail in another embodiment of the present invention.

The function and action of the automatic position information transmission system using the wireless data network according to the embodiment of the present invention having the above-mentioned configuration will be described with reference to the accompanying drawings.

Figure 5:
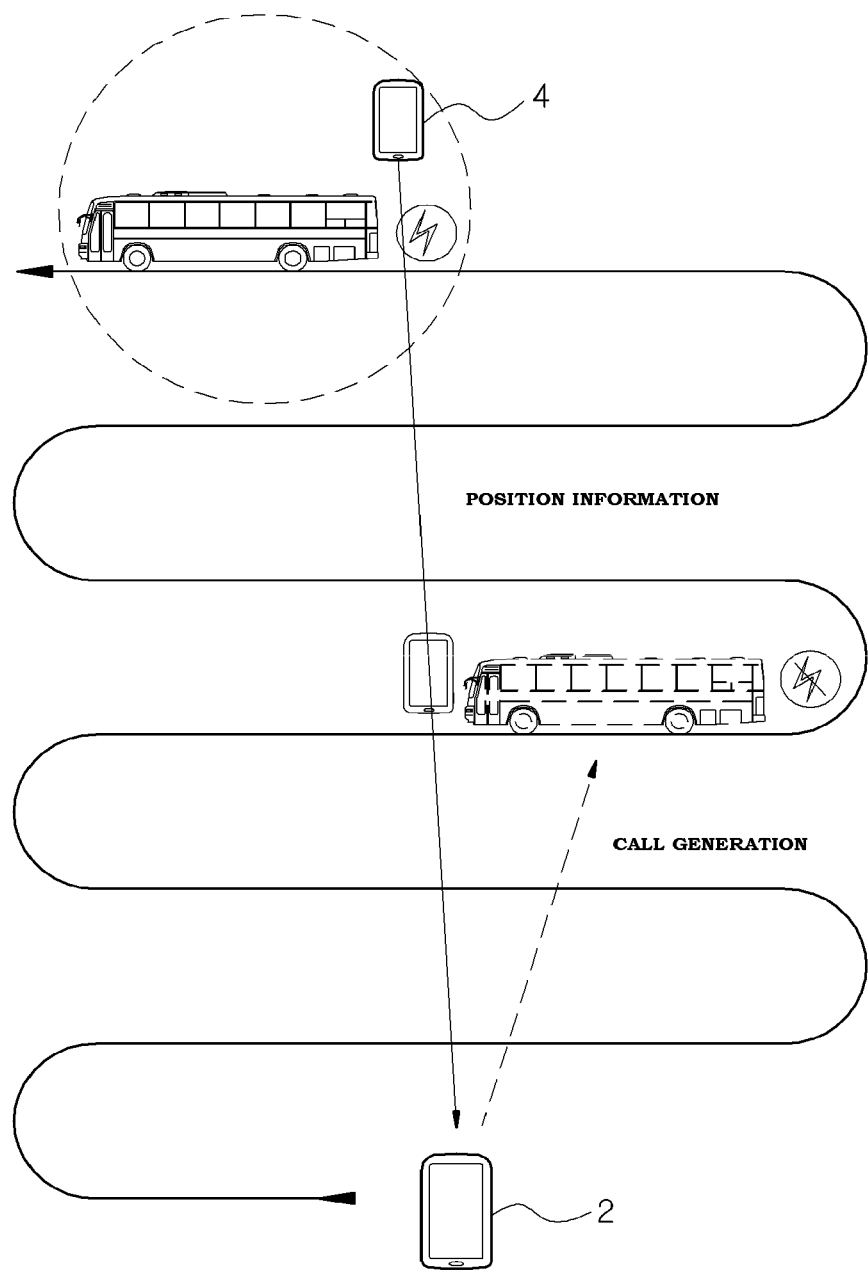
FIG. 5 is a diagram showing an automatic position information transmission status through the automatic position information transmission system using the wireless data network according to the embodiment of the present invention.
Figure 6A:
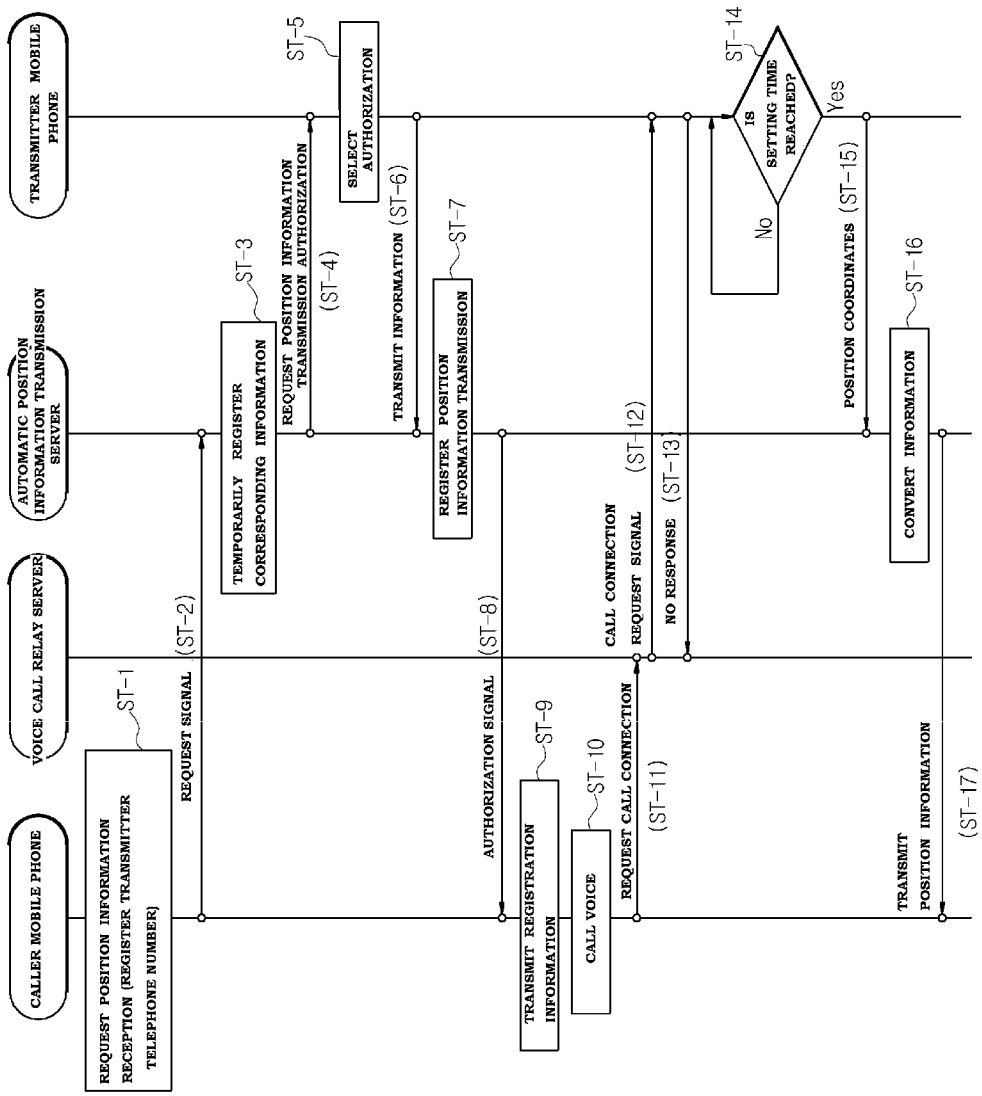
FIGS. 6A and 6B are flow charts showing a signal flow of the automatic position information transmission system using the wireless data network according to the embodiment of the present invention.
Figure 6B:
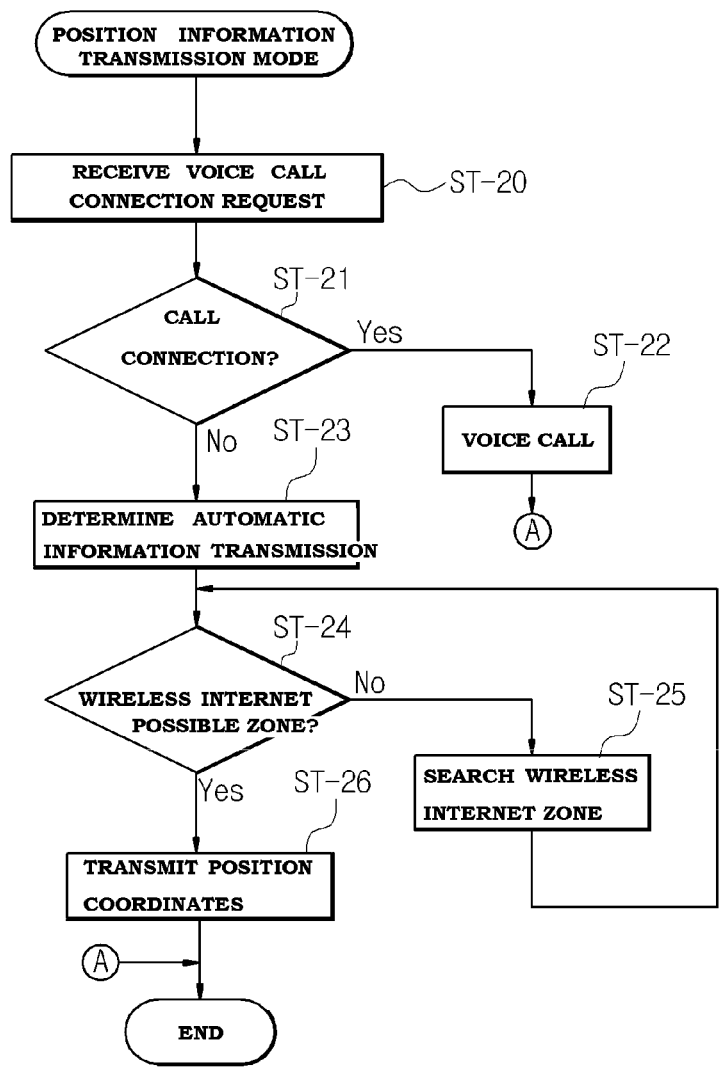

FIG. 5 is a diagram showing an automatic position information transmission status through the automatic position information transmission system using the wireless data network according to the embodiment of the present invention, and FIGS. 6A and 6B are flow charts showing a signal flow of the automatic position information transmission system using the wireless data network according to the embodiment of the present invention.

First, the mobile phone 2 of the first user (same as the caller's mobile phone) included in the automatic position information transmission system using the wireless data network according to the embodiment of the present invention transmits the request information including its own telephone number information and position information transmission condition information, and the third party's mobile phone number information to the automatic position information transmission server 10 so as to receive the position information of the children or a specific person.

In this case, the automatic position information transmission server 10 temporarily registers the corresponding information and transmits the corresponding authorization request information to the mobile phone 4 (same as the transmitter's mobile phone) of the second user that is the other party.

When the second user transmits the authorized information to the automatic position information transmission server 10 through the mobile phone 4 of the second user, the automatic position information transmission server 10 registers the approval information together with the telephone number information of both parties repeating the position information.

Further, the automatic position information transmission server 10 transmits the authorized signal to the mobile phone 2 of the first user, which can be confirmed by the first user.

When the conditions to automatically transmit the position information are satisfied in the state in which the automatic position information transmission conditions are set in the automatic position information transmission server 10, the mobile phone 4 of the second user transmits the condition satisfaction signal to the automatic position information transmission server 10.

Thereafter, the automatic position information transmission server 10 previously extracts the telephone number of the mobile phone 2 of the first user that receives the linked position information and transmits the position information of the mobile phone 4 of the second user to the corresponding mobile phone 2 of the first user.

In the case in which non-response is continued for a predetermined time or more at the time of the call connection, when the call connection is not performed for a predetermined time even though the mobile phone 2 of the first user attempts the call connection to the mobile phone 4 of the second user in the state in which the conditions are set as transmitting the position information, the mobile phone 4 of the second user automatically extracts the position coordinates and transmits the extracted position coordinates to the automatic transmission server 10.

At this time, the automatic position information transmission server 10 converts the corresponding position coordinates into the place information and transmits the converted place information to the mobile phone 2 of the first user so as to be output on the screen.

When the mobile phone 4 of the second user is not present in the wireless Internet area at the time of transmitting the position information, the mobile phone 4 of the second user searches the wireless Internet area and does not perform the transmission of the position information of the corresponding place until the wireless Internet area is searched.

Meanwhile, the automatic position information transmission system using the wireless data network according to the embodiment of the present invention may allow the second user to set the automatic position transmission for each period in the mobile phone 4 of the second user when the second user is travelling. Therefore, the mobile phone 4 of the second user automatically transmits the corresponding position information to the mobile phone 2 of the first user for each predetermined time interval even though there is no call connection or separate attempts.

Hereinafter, an automatic position information transmission system using a wireless data network according to another embodiment of the present invention will be described in detail with reference to the accompanying drawings.

Figure 7:
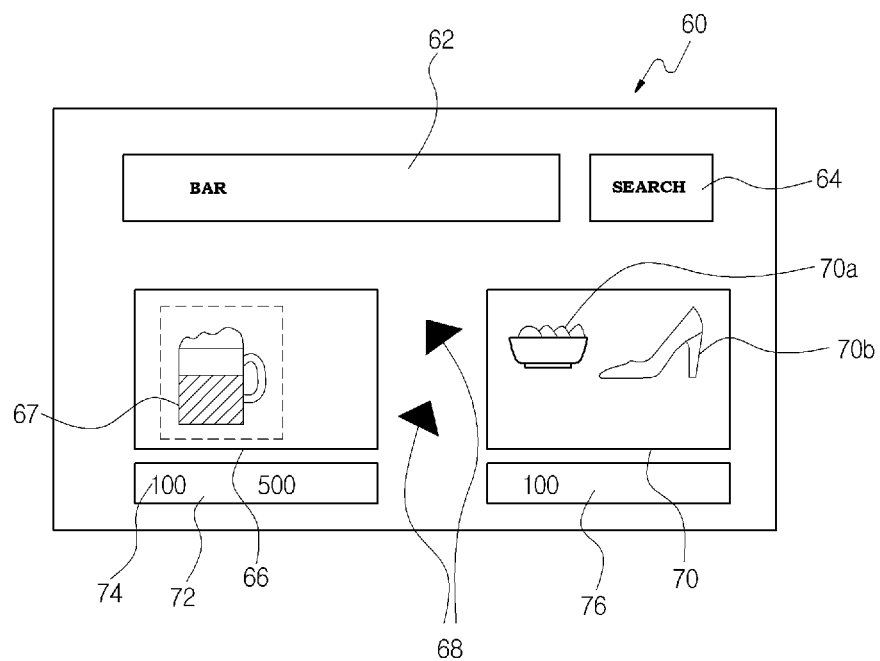
FIG. 7 is a diagram showing a status in which icons are registered through the automatic position information transmission system using the wireless data network according to the embodiment of the present invention.
Figure 8:
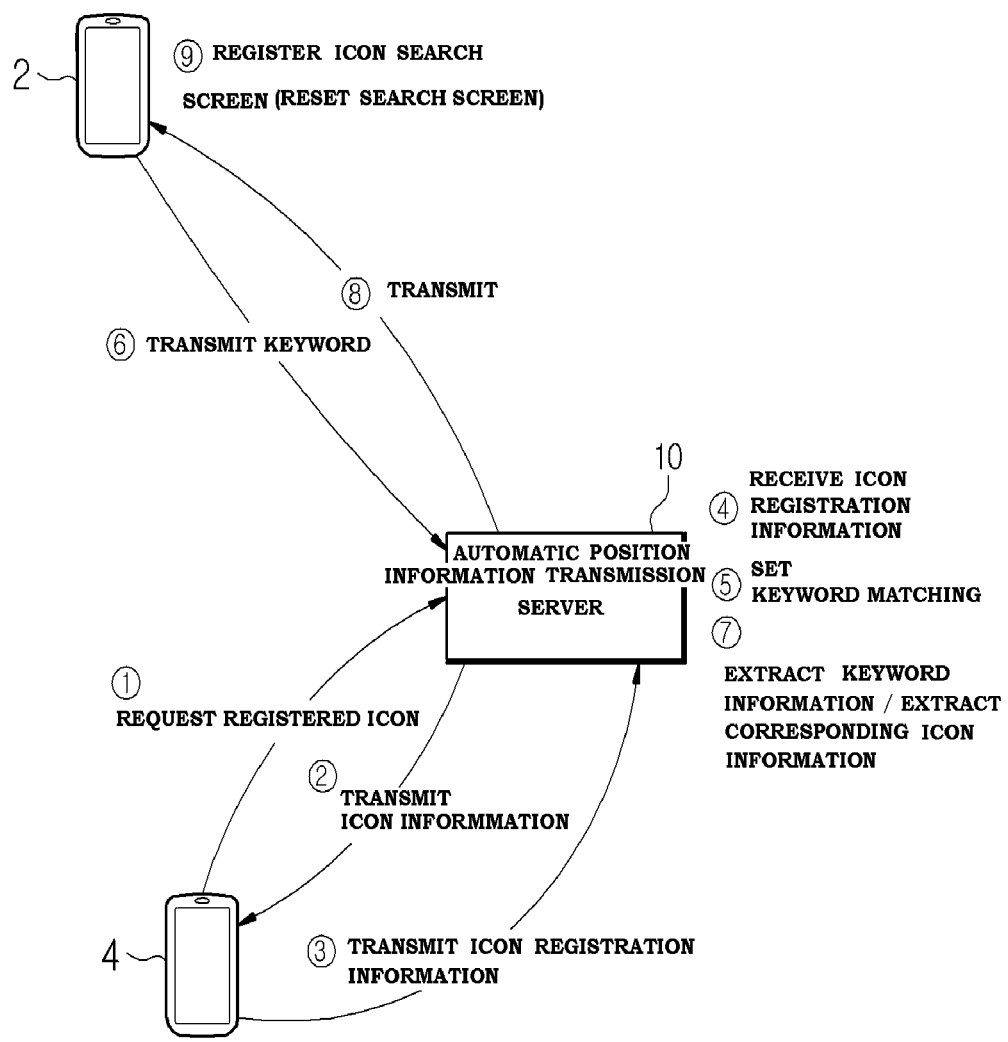
FIG. 8 is a diagram showing a status in which data is transmitted through an automatic position information transmission system using a wireless data network according to another embodiment of the present invention.

FIG. 7 is a diagram showing a status in which icons are registered through the automatic position information transmission system using the wireless data network according to the embodiment of the present invention, and FIG. 8 is a diagram showing a status in which data is transmitted through an automatic position information transmission system using a wireless data network according to another embodiment of the present invention.

Referring to FIGS. 7 and 8, the automatic position information transmission system using the wireless data network according to another embodiment of the present invention is a system that may register icons associated with keywords on the search screen of the corresponding mobile phone and register the icons representing the search position range on the screen to increase the convenience of search.

In more detail, the automatic position information transmission system using the wireless data network according to another embodiment of the present invention includes: the mobile phone 2 of the first user that inputs and executes the keywords on the search screen 60 provided by the automatic position information transmission server 10 and registers search icons 67, 70a, 70b matching the corresponding keywords provided by the automatic position information transmission server 10; and the mobile phone 4 of the second user that transmits the position information so as to match the search icons according to industry classification, with icons being owned by an advertiser, and generates request signals for matching; the automatic position information transmission server 10 that receives and registers a search icon request signal, workplace information, and workplace position information, classifies the search icons 67, 70a, and 70b for each business and stores the classified search icons so as to be able to be transmitted to the mobile phone 2 of the first user, and manages the local information according to the position and business of each advertiser.

Referring to FIG. 7, the search icons provided by the automatic position information transmission server 10 may be outputted on the screen of a mobile phone 2 of the first user and registered on the search screen 60. For example, when the user inputs "bar" on a keyword input column 62, the word, "bar" is transmitted to the automatic position information transmission server 10 and the automatic position information transmission server 10 searches whether there are search icons matching the corresponding word. When a search icon 67 meaning "bar" is searched, a selection window 72 outputting a search position radius 74 is outputted on the screen while the icon is outputted to an icon selection window 66.

Meanwhile, a button 68 operating selection and deletion is provided adjacent to the selection window 72 and the output window 70 of the search icons 70a and 70b selected by the user so as to be registered on the screen and a search position radius output window 76 are each provided.

Meanwhile, the mobile phone 2 of the first user selects by clicking a plurality of search icons registered on the search screen, thereby replacing the keyword input. To this end, the search icons are matched with keywords or are linked with codes matching the keywords so as to be transmitted.

In addition, the automatic position information transmission server 10 determines whether there are the search icons matching the corresponding keywords when the keywords are transmitted from the mobile phone 2 of the first user as the character data and transmits the corresponding search icons to the mobile phone 2 of the first user if it is determined that there are the search icons.

To this end, as shown in FIG. 4, the automatic position information transmission server 10 includes: a search icon manager 48 that manages the search icons matching the keywords; and an icon download information manager 50 that may manage download information regarding the search icons and then, build the target information matching the corresponding user. The data storage unit 52 is stored with the search icons matching the keywords and the search position radius (for example, 100 m, 200 m, and 500 m) in an icon form.

In addition, when there are no search icons matching the keywords transmitted by the first user terminal 2, the automatic position information transmission server 10 is configured to automatically store non-existence information of the corresponding search icons.

The function and action of an automatic position information transmission system using a wireless data network according to another embodiment of the present invention having the above-mentioned configuration will be described with reference to the accompanying drawings.

Figure 9:
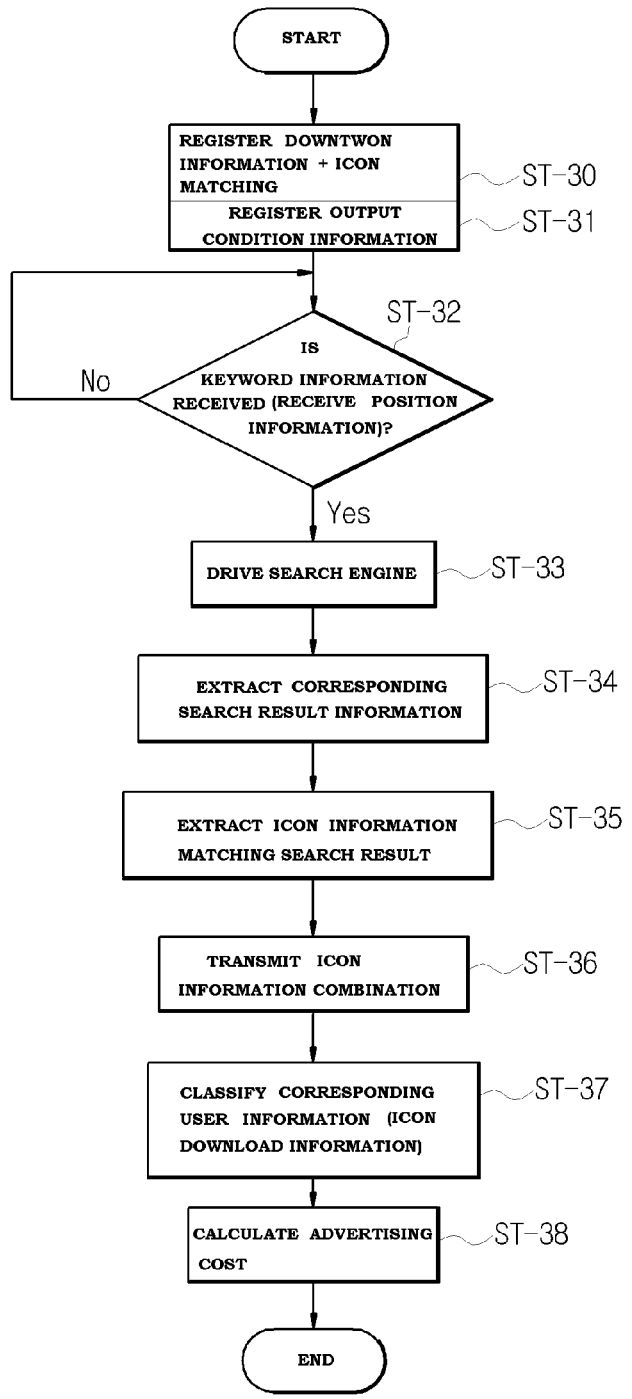
FIG. 9 is a flow chart showing a signal flow of the automatic position information transmission system using the wireless data network according to another embodiment of the present invention.

FIG. 9 is a flow chart showing a signal flow of the automatic position information transmission system using the wireless data network according to another embodiment of the present invention.

First, the automatic position information transmission server 10 included in the automatic position information transmission system using the wireless data network according to another embodiment of the present invention receives and registers downtown information, icon information, and output condition information.

That is, the automatic position information transmission server 10 receives and registers various advertising information that may match the search icons as the search advertising information from the mobile phone 4 of the second user that is a mobile phone of an advertiser.

In the status, the automatic position information transmissions server 10 determines whether the keyword information is received from the mobile phone 2 of the first user that is a mobile phone of a general user and drives a keyword engine when the keyword information is received.

In this case, the automatic position information transmission server 10 may receive the search radius information from the mobile phone 2 of the first user and may perform the local search at the time of driving the search engine.

Therefore, the automatic position information transmission information 10 may extract the search results and at the time same, determine whether there are the search icons matching the corresponding keywords. When there are the icons (for example, an icon representing a bar shape) matching the keywords (for example, bar), the corresponding search icons are extracted.

Further, the automatic position information transmission server 10 transmits the corresponding search icons to the mobile phone 2 of the first user and registers the transmitted search icons on the search screen. Similarly, the automatic position information transmission server 10 may extract the icons representing the search radius and transmit the extracted icons to the mobile phone 2 of the first user.

Therefore, when the first user registers the search icons on the screen through the mobile phone 2 of the first user, the keywords (for example, "bar") for which icons are present do not need to be input one by one. That is, when the icons are simply selected, the keywords automatically matched may be transmitted to the automatic position information transmission server 10.

In this case, in the automatic position information transmission system using the wireless data network according to the embodiment of the present invention, the advertiser calculates advertising costs for the matching of downtown information regarding the search icons and the exposure of the corresponding downtown information at the time of selecting the search icons and then, may pay the expenses to the business operation of the automatic position information transmission server 10.

While the automatic position information transmission system using the wireless data network according to the present invention has been described with reference to the preferred embodiments, it will be understood by those skilled in the related art that various modifications and variations may be made therein without departing from the scope of the present invention as defined by the appended claims.

What is claimed is:

1. An automatic position information transmission system using a wireless data network, comprising:
   a mobile phone of a first user that generates request signals for automatic position information transmission of a mobile phone of a second user and receives position information automatically transmitted from a corresponding mobile phone of a second user according to authorized signals and outputs the received position information on a screen; and
   a mobile phone of a second user that receives request signals for the automatic position information transmission from the mobile phone of the first user and outputs the request signals through the screen, has a GPS module mounted therein so as to automatically transmit position coordinates to the mobile phone of the first user at the time of satisfying predetermined conditions according to the transmission of the authorized signals, and is equipped with automatic transmission programs, wherein the mobile phone of the second user automatically accesses the wireless Internet network to transmit the corresponding position coordinates when the mobile phone of the second user receives the call connection request signals from the authorized mobile phone of the first user, if the call connection is not performed for a predetermined time.

2. The system of claim 1, wherein the mobile phone of the second user includes a wireless Internet interface that accesses a wireless Internet network to transmit position coordinates.

3. The system of claim 1, wherein the position coordinate transmission conditions of the mobile phone of the second user is a case in which the second user sets a predetermined period and a time range, a case in which the call connection is not performed at the time of the request of the call connection from the authorized mobile phone of the first user, or a case in which the position coordinates are changed.

4. The system of claim 1, further comprising an automatic position information transmission server that receives the position coordinates transmitted from the mobile phone of the first user and converts the received position coordinates into place information and transmits and processes the place information to the pre-authorized mobile phone of the second user.

5. The system of claim 1, wherein the authorization request signals of the mobile phone of the first user are time range and time period information for which it is desired to receive the telephone number information position information of the mobile phone of the first user.

6. The system of claim 1, wherein the mobile phone of the second user includes:
   a key input unit that selects the authorized signal and the position information transmission method; a display unit that outputs the key operation status or the information transmitted from the mobile phone of the first user on the screen; a duplexer that separates the transmitted/received signals by performing wireless communication with the base station of the mobile communication network through an antenna and includes a wireless Internet interface separately mounted therein;
   a wireless Internet interface that is mounted in the duplexer and accesses a wireless Internet server (WAP server) of a predetermined URL through the wireless Internet network in software as a demon for wireless Internet connection;
   a receiver that receives a voice signal or character or image information from the mobile phone of the second user or a wired telephone terminal or a mobile communication exchanger through the antenna and the duplexer;
   a transmitter that filters and amplifies the voice signal input from a microphone so as to be able to be transmitted;
   a voice processor that processes the voice signal from the other party received through the receiver, outputs the processed voice signal through a speaker and processes the voice signal of the user received from the microphone, and outputs the processed voice signal to the transmitter;
   a GPS receiving module that receives the position coordinates from a GPS satellite;
   a data combination unit that combines the position coordinates and the telephone number of the mobile phone of the first user that is the transmission object with the pre-registered character message; and
   a controller that determines whether the transmission conditions are satisfied according to the position information transmission request transmitted from the mobile phone of the first user, automatically combines the position coordinates if it is determined that the transmission conditions are satisfied, and accesses the wireless Internet network to transmit and process the position coordinates to the mobile phone of the first user.

7. The system of claim 1, wherein when the position coordinate transmission conditions are satisfied, the mobile phone of the second user searches whether the mobile phone of the second user periodically accesses the wireless Internet network when the mobile phone of the second user does not access the wireless Internet network and transmits and processes new position coordinates when the mobile phone of the second user accesses the wireless Internet network.

8. The system of claim 4, wherein the automatic position information transmission server includes: a communication module that communicates with the mobile phones of the first and second users; an automatic position sharing authorization unit that performs an authorization for sharing the mutual position information of the mobile phones of the first and second users according to whether the mutual request and authorization signal is received; a position information converter that converts the received position coordinates into the place information; an automatic transmission processor that automatically transmits and processes the position information to the matched other party mobile phone; a data storage unit that stores the place information and the authorized information regarding the position information sharing matched with each position coordinate; and a controller that controls each component to transmit and process the position information regarding the mobile phones of the first and second user.

9. An automatic position information transmission method using a wireless data network, comprising:
receiving, by a mobile phone of a second user, signals for position information transmission request authorization and condition information from a mobile phone of a first user;
generating authorization signals by the mobile phone of the second user;
registering condition information of position information transmission to the mobile phone of the second user;
determining whether the mobile phone of the second user satisfies position information transmission conditions;
extracting, the mobile phone of the second user, position information through a GPS module;
transmitting the corresponding position information pre-stored in the mobile phone of the second user to the mobile phone of the first user,
wherein the transmitting further includes searching whether the mobile phone of the second user periodically access a wireless Internet network when the mobile phone of the second user does not access the wireless Internet network and transmitting and processing new position coordinates at the time when being connected to the wireless Internet network.

10. The method of claim 9, wherein the condition information of the receiving is any one of a predetermined period and time range and an elapse of a predetermined time every time a call is connected or from a time when a call connection is not performed.

* * * * *